（12）United States Patent
Gill

(10) Patent No.: US 7,021,333 B1
(45) Date of Patent: Apr. 4, 2006

(54) REVERSE FLOW MODIFIABLE COMBINATION VALVE

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 0 days.

(21) Appl. No.: 11/198,424

(22) Filed: Aug. 4, 2005

(51) Int. Cl.
*F16K 31/145* (2006.01)

(52) U.S. Cl. ................. 137/613; 137/625.33; 251/61.1
(58) Field of Classification Search ................. 137/613, 137/625.3, 625.33, 625.37, 625.38; 251/61.1
See application file for complete search history.

(56) References Cited

U.S. PATENT DOCUMENTS

| 5,020,571 A | * | 6/1991 | Tartaglia et al. ......... 137/625.3 |
| 5,069,248 A | * | 12/1991 | Gill ............................ 137/613 |
| 6,505,646 B1 | * | 1/2003 | Singleton ................. 137/625.3 |

* cited by examiner

*Primary Examiner*—John Fox

(57) ABSTRACT

Reverse Flow Modifiable Combination Valve is a valve which has a common cage in which different types of fluid control means can be installed in a fix location to produce more than one type of valves having different flow characteristics, and inner flow control means of the valve can be inspected and replaced without removing cage of the valve.

20 Claims, 10 Drawing Sheets

SECTION 1-1

REVERSE FLOW MODIFIABLE COMBINATION VALVE

BACKGROUND OF THE INVENTION

1. Field

The invention is in the field of reverse flow control valves, pressure reducing valves, pressure relief valves, and shut off valves, to control flow of fluid through a pipe line.

2. State of the Art

The invented valve is in the same art unit as the inventor's valves Patented under U.S. Pat. No. 5,069,248, and U.S. Pat. No. 6,834,675 B1. Compared to conventional valves in the field, the new invented valve is designed to handle much wider ranges of fluid pressures and temperatures. The new invented valve also eliminates the use of the receptacles for the diaphragms used in the above mentioned U.S. Pat. No. 5,069,248. Unlike said U.S. Pat. No. 6,834,675 B1, the new invented valve provides a common geometry for a valve cage which can accommodate more than one type of valve components, which, instead of being ratable, are fixed in their locations in the valve body, to modify the valve such as to provide the desired functionality. The valve components can be replaced while the cage remains in the pipe line. The inner control components of the valve can be used in combinations, taken two components at a time or only one component at a time, to produce a distinct valve having distinct flow characteristics. From here on a valve component will be understood as being a distinct inner valve component which can block or control the fluid flow inside the outer valve body (the valve cage), singularly or in combination with another valve component.

Most valves currently in use are produced as single units, where each valve is designed to perform a limited and specific function. With the invented valve, the manufacturing cost of the valve and valves can be reduced by using a common valve cage (which is the outer valve body) which can be used to produce more than one type of valve or a combination of valves.

The object of the invention is to provide valve components, which can be used in combination inside the common valve cage, to produce or to modify a valve to have distinct flow characteristics and to achieve production cost advantages. When the same manufacturing method is used to produce the valve cage for different valve components, the cost to produce the valves is minimized.

SUMMARY OF INVENTION

According to the invention, the Reverse Flow Modifiable Combination Valve flow control and pressure reducing valve includes a valve body, which can be manufactured using current manufacturing techniques, including casting, machining, welding, and fabricating, or any combinations thereof. The valve has a lower body and an upper body. The lower body has at least one inlet chamber and at least one outlet chamber, both of which are connected to the upper body. A partition means, within said upper body, physically separates the inlet chamber from the outlet chamber, while allowing said inlet and outlet chambers to remain fluidly connected. The lower valve body is adaptable, to allow it to be connected to upstream and downstream pipes, and also to allow it to be connected with said upper body, with the connection including the partition means extending perpendicularly from the lower body. The direction of the flow of fluid is changed as the flow enters the upper body, and is reversed as it flows back to the lower body.

A plurality of passages are formed in the valve body, circumferentially spaced around the partition means, and extending through the valve body from the inlet chamber to the outlet chamber. Each passage has an inlet portion opening into the inlet chamber adjacent one face of the partition means and outlet portion opening into the outlet chamber adjacent the other face of the partition means. Said passages are covered by cylindrical cover means, which provide space between the cover means and the body of the valve for the designed volume of fluid flow. A modifiable piston gate valve is centrally positioned in the upper body, and is controlled by supplying fluid from upstream fluid flow. Alternatively, said piston gate valve can be operated with independent pressurized fluid outside the pipe line. The piston can control a variable volume of fluid flow. The height of the piston from its seat can be varied by means of conventional pilot control and needle valves. Solenoid switches connected with the fluid inlet port and outlet port can also be used to control the valve. The piston rod, for said piston, can be operated manually or by en electric motor. Thus the piston can be raised or lowered, by means of pressurized fluid, or manually, or with a motor. The piston is fluidly balanced and biased to close. Extending in the opposite direction from the rod of the piston, concentric perforated tubes (or, alternatively, a single tube), running parallel to the piston rod, and having radial rectangular openings (heretofore called "linear openings") in their bodies, are attached to the piston by means of bolts, or are welded to the piston, or are constructed with the piston integrally. Alternatively, the piston can be made of a rod and a flat plate. Said linear openings, in said concentric perforated tubes, are located between the ends of each tube, starting at a distance away from each end. It is equally practical that each tube is provided a set of linear openings starting a distance away from the piston plate and running parallel to the piston rod, clear to the other end of the tube. Regardless of whether any concentric tube has a set of perforated openings, or whether it has a set of linear openings in its cylindrical body, the size, the location, and the circumferential distance between the openings is predetermined. The openings in each cylindrical tube are staggered from the openings of the next concentric cylindrical tube for the purpose of requiring that fluid passing through an opening in one tube will strike the solid portion of the next tube. This will create multiple collisions between oppositely directed fluid streams themselves, and between the fluid streams and the tubing walls. Said cylindrical tubes are lowered into the corresponding cavities provided in the inner portion of the partition means located inside the upper cage portion (upper body) of the valve. A cover means is provided to cover the piston by passing the piston rod through the opening located in the center of the cover means. A predetermined distance between the piston plate and the cover for the piston is provided, which distance creates a chamber for the pressurized fluid to operate the piston. The cover over the piston is provided with at least one opening for the two way fluid flow. The opening is connected to conventional needle and pilot valves to control the piston's position. The partition means, directly under the piston, provides the piston with a seat when the piston is in its closed position. When the piston is raised from its seat, fluid is allowed to pass under the piston plate and through the openings in the concentric tubes. At any given height of the piston from its seat, a constant passage area is preferably provided by each cylindrical tube for the passage of fluid to provide the fluid stream, with an approximately uniform exit velocity, from one tube to the next tube, under the piston. As mentioned above, each opening in the inner tube faces a solid opposite wall in the next outer cylindrical tube. Thus, when fluid passes through the opening in the inner tube it strikes against the opposite solid wall of the outer tube, and is therefore redirected in multiple directions, normal to the original flow. Thus, many fluid strikes against walls and collisions between opposite fluid streams are created to dissipate energy to reduce pressure at the exit of the valve. The bases (bottoms) of each of the cavities, which accommodate said cylindrical tubes extending from the piston, are each provided with an opening or openings of a predetermined size, so that, when the piston is pushed into the cavities it does not have fluid resistance against its travel. This mechanism also biases the piston in favor of the closed piston valve position. The upstream fluid to operate the piston is accessed either through the piston plate and piston rod itself or it is accessed from the upstream port located suitably on the body of the inlet chamber in the cage body.

The cylindrical space, between the outer upper cylindrical body of the valve and the cylindrical cover around said outer upper body, can be modified to accommodate an elastomeric flow control means. Flow control means (similar to in U.S. Pat. No. 6,672,334,B2 patented by the inventor) or the modified control means hereby presented in this patent, are positioned in the passages, and are responsive to pressurized fluid on both sides of said flow control means. The modified invented flow control means is a bell type cylindrical elastomeric diaphragm which includes an asymmetrical radially outwardly extending hump, and with unequal legs extending axially from the opposite sides of the hump. The hump of the diaphragm is positioned over and around the plurality of inlet openings and the longer leg is positioned over the plurality of outlet openings of the valve body. The partition means are partially situated under the hump and partially under the longer leg of the diaphragm means. The hump creates a hollow circular cavity around the plurality of inlet openings. The portion of the diaphragm on the side of the shorter leg functions to maintain the proper shape of the diaphragm. The valve can be closed or opened much faster than conventional sleeve type valves, because much less fluid volume is required to operate the diaphragm. The elastomeric diaphragm can function as a flow control means valve, and can also function as a pressure reducing valve. The invented valve can also accommodate one or two elastomeric hat shaped diaphragms as invented and shown in the inventor's U.S. Pat. No. 6,834,675 B1.

One of the modifications of the valve can provide five-way fluid flow. The valve is provided with seal gaskets wherever needed. The elastomeric diaphragm and the piston can be operated by the same set of needle and pilot valves or by two separate independent sets of needle and pilot valves.

The invention also makes it possible to construct a valve using two mirror images of each other, integrated together, with one comprising the top half the of the valve, and the other comprising the bottom half. With the descriptions of the drawings it will become clear that the invented valve can be readily modified to produce valves having entirely different flow characteristics; thus the scope and the usefulness of the valve is enhanced.

THE DRAWINGS

In the accompanying drawings, which illustrate the best mode presently contemplated for carrying out the invention:

Figure 6:
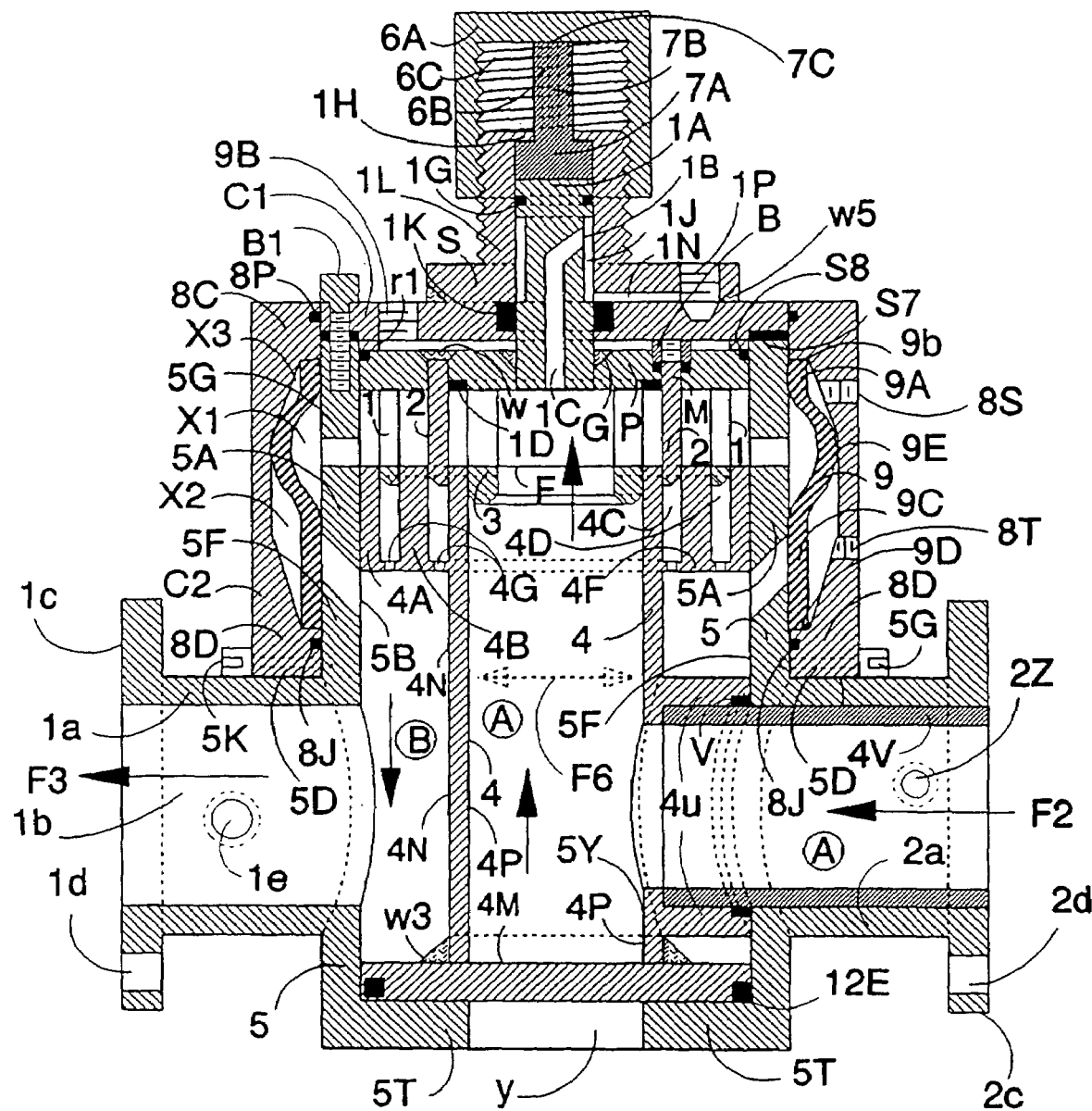
FIG. 6, is another axial vertical section, similar to that of FIG. 2, showing an elastomeric diaphragm in accompaniment with the piston gate valve, where the outer cover and the upper cover are not integrated together (by welding, casting, or machining) and are, instead, two independent components.
Figure 7:
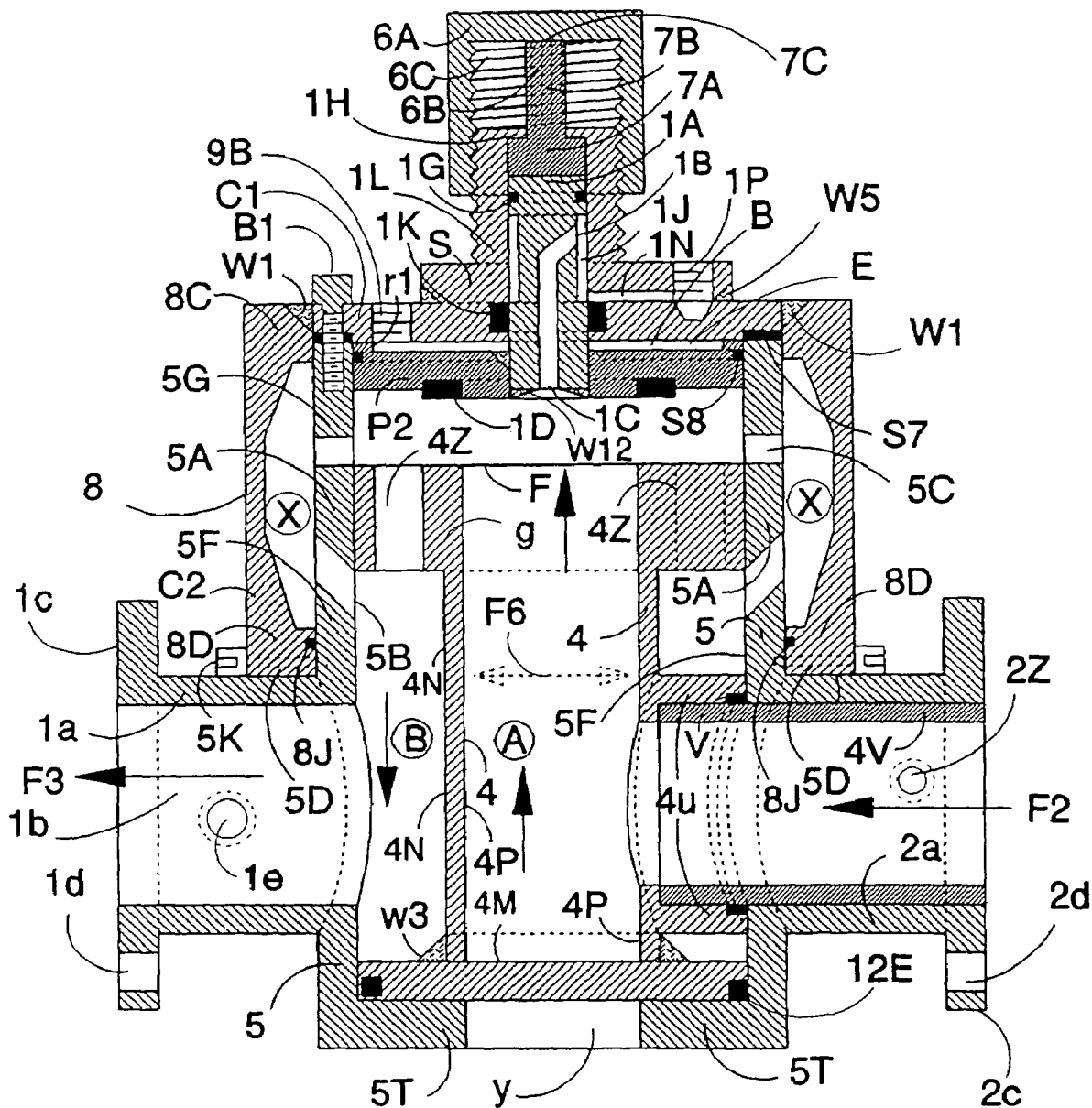
Figure 8:
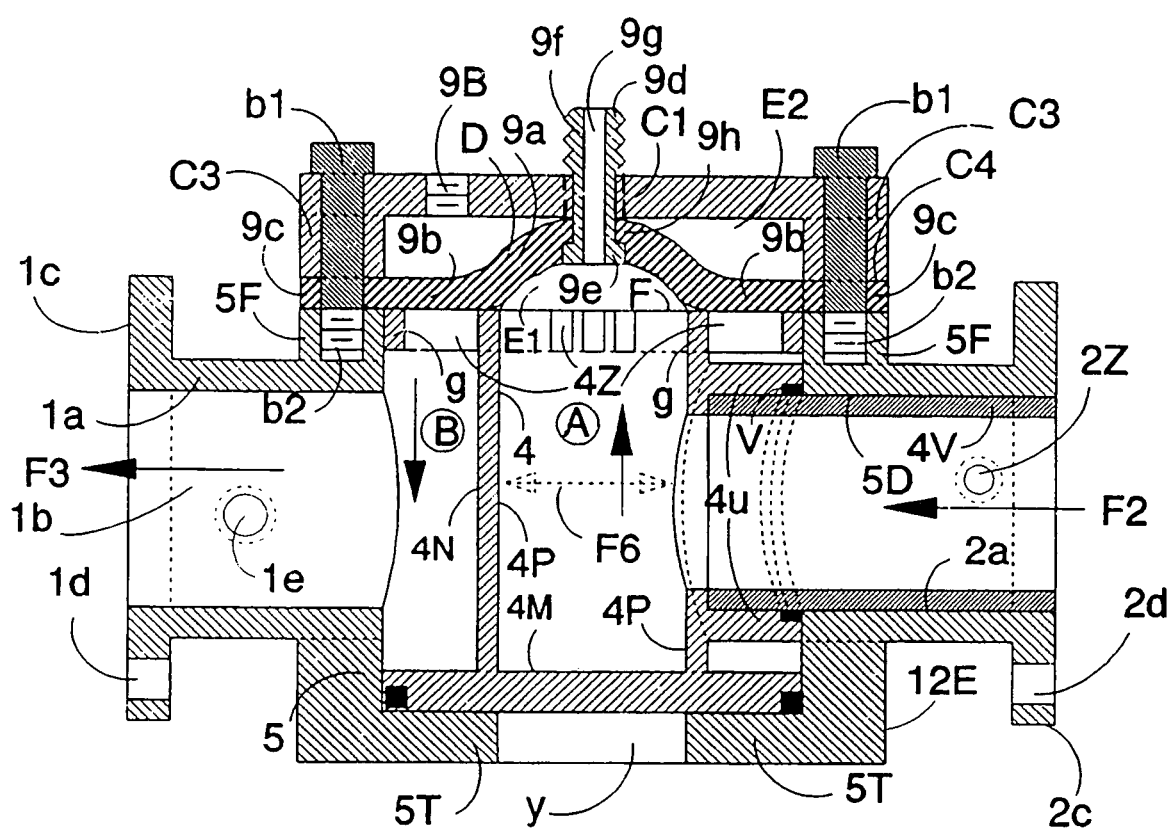

FIG. 7 is similar to FIG. 6 but does not include an elastomeric diaphragm, where the piston in FIG. 7 differs from the piston in FIG. 6 in that it does not have concentric tubes with radial openings, and is, instead, just a flat plate. The inner partition means of FIG. 7 is provided with fluid passages 4Z to increase the capacity of the valve by passing extra flow through said fluid passages, in addition to the flow handled by cavity X;

FIG. 8 is similar to FIG. 7 where they both use the same partition means, and they both have elastomeric diaphragms, but the diaphragm of FIG. 8 differs from FIG. 7, in that the diaphragm of FIG. 8 is in the shape of a big hat. Also, cover C2 of FIG. 7 is eliminated, and only cover C1 is used.

Figure 9:
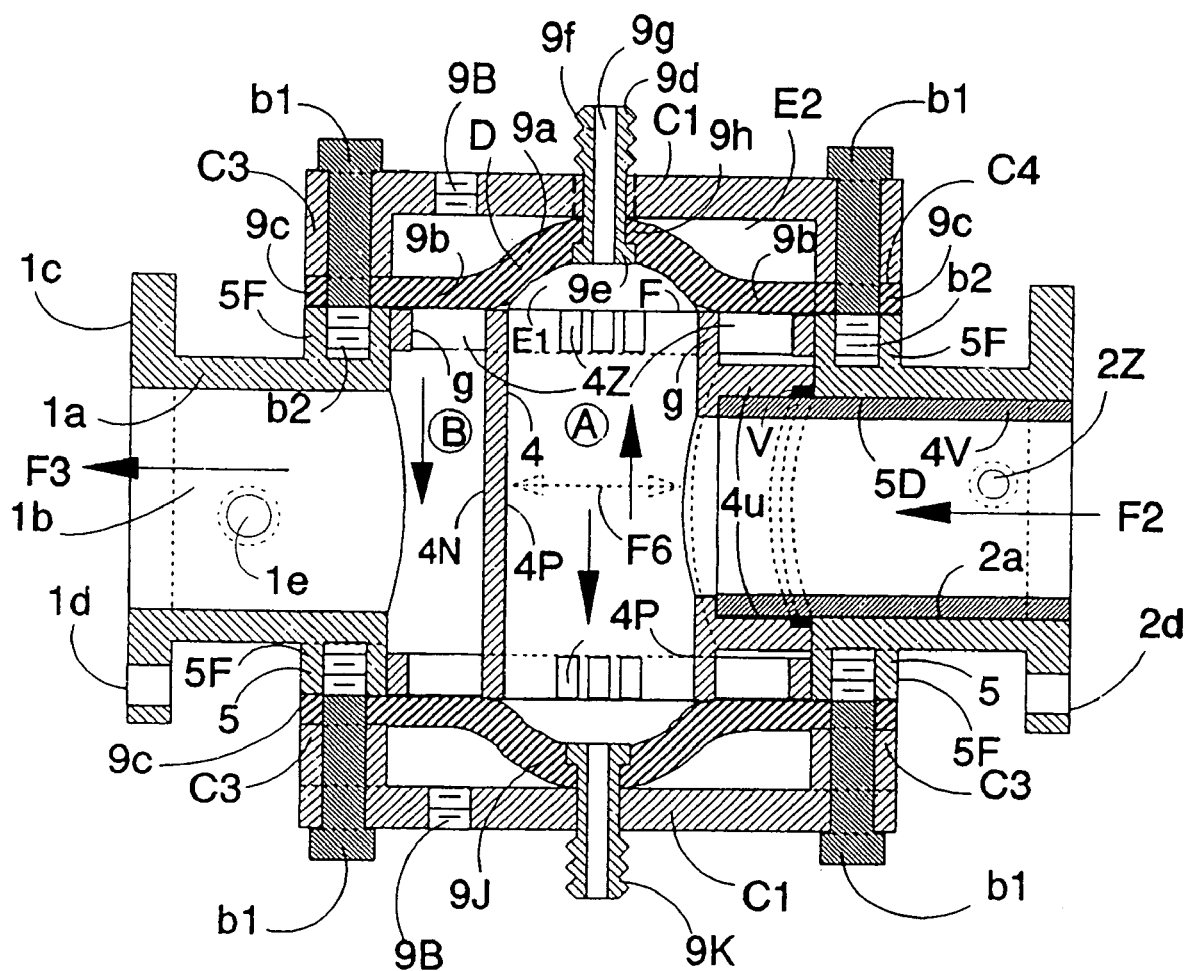

FIG. 9 is the same as FIG. 8, except that the bottom portion of the valve of FIG. 9 is a mirror image of the top portion of the valve. Each of these portions include an elastomeric diaphragm of the type shown in FIG. 8.

Figure 10:
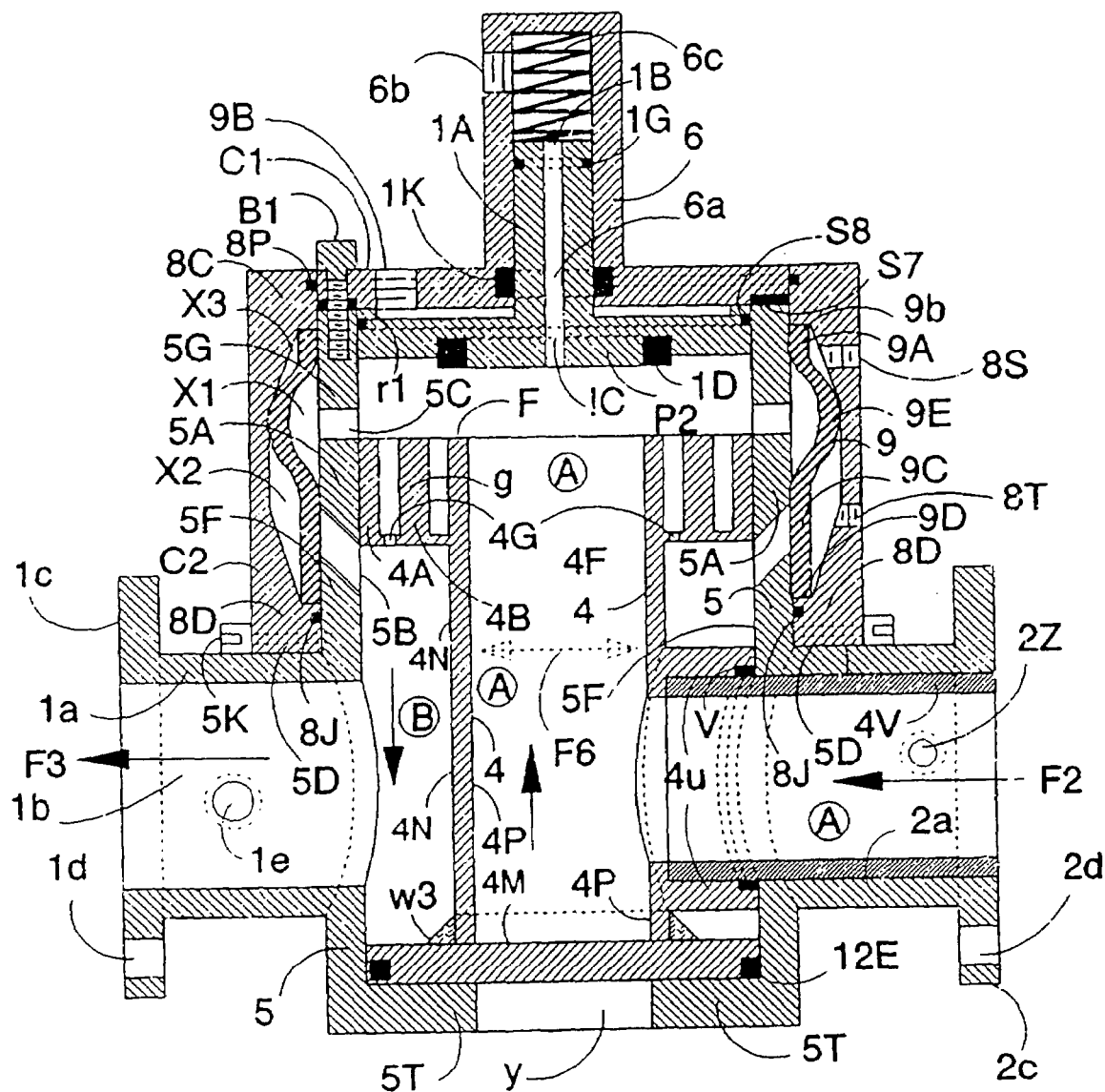

FIG. 10 is similar to FIG. 6 where, the piston and its actuating mechanism have been modified.

Figure 11:
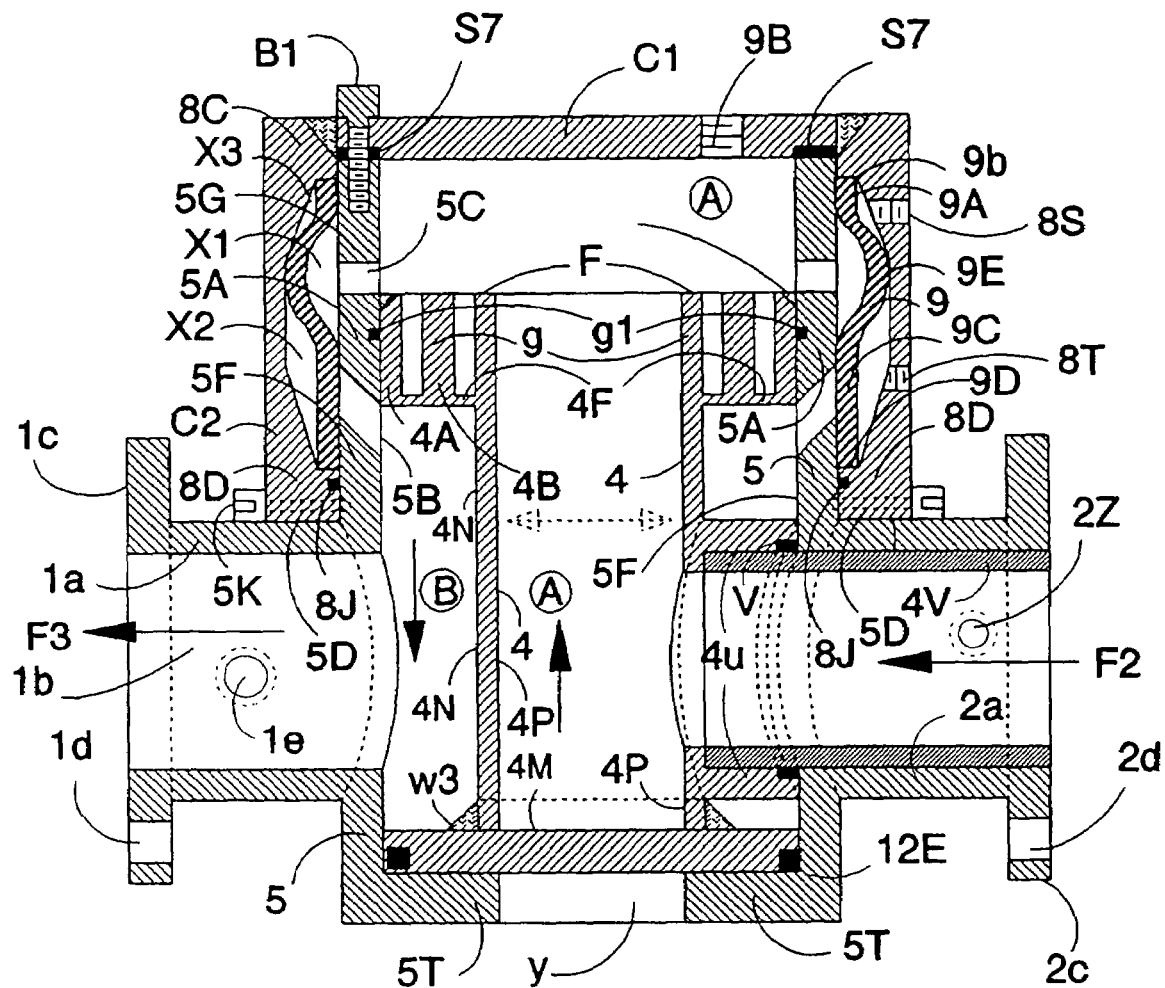

FIG. 11 is similar to FIG. 10 where, piston have removed from the valve and only the elastomeric diaphragm is used.

DETAILED DESCRIPTION OF THE ILLUSTRATED EMBODIMENT

Figure 1:
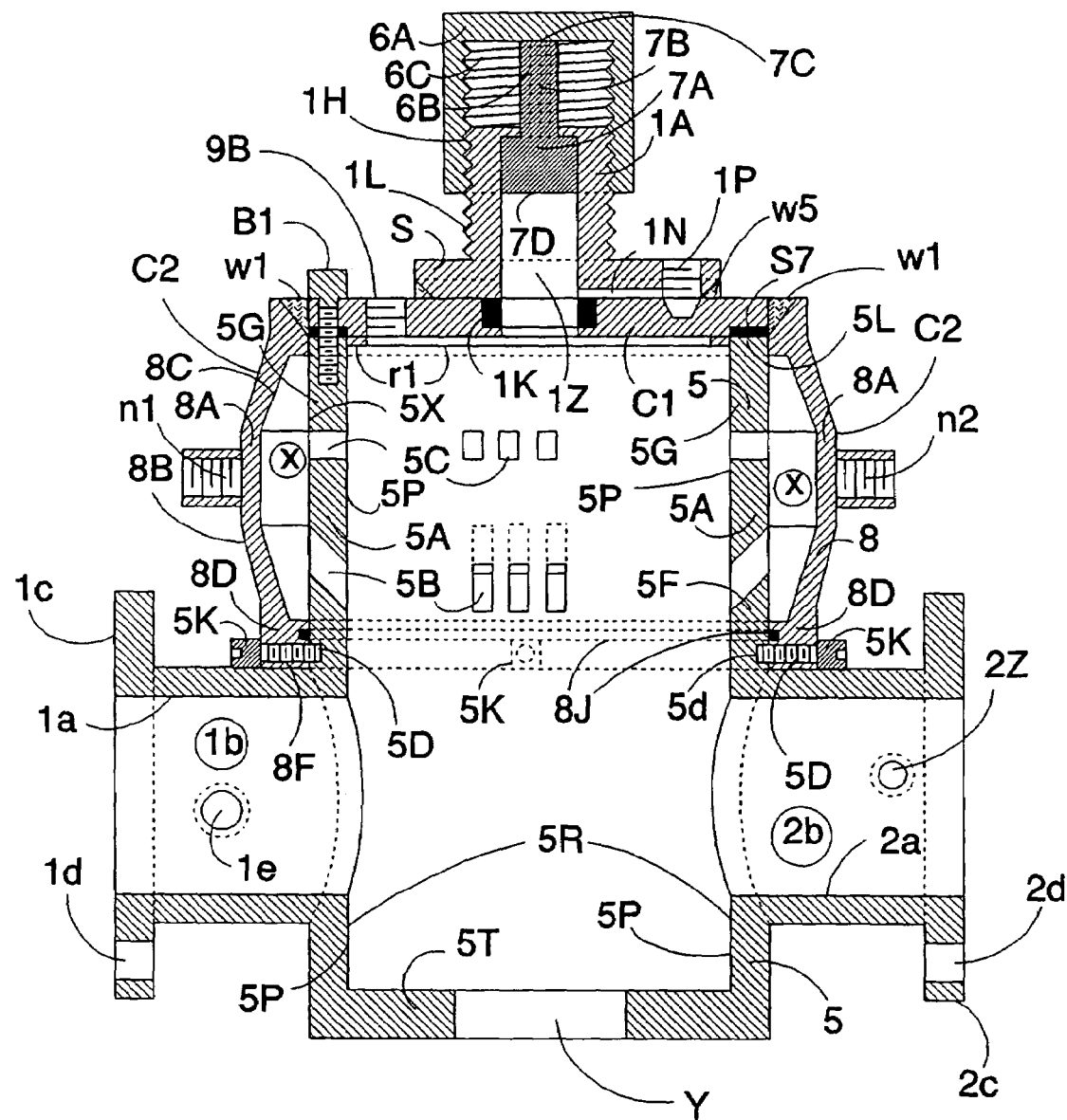
FIG. 1 is an axial vertical section through the cage, and a composite cover which goes around and over the cage of the valve.
Figure 2:
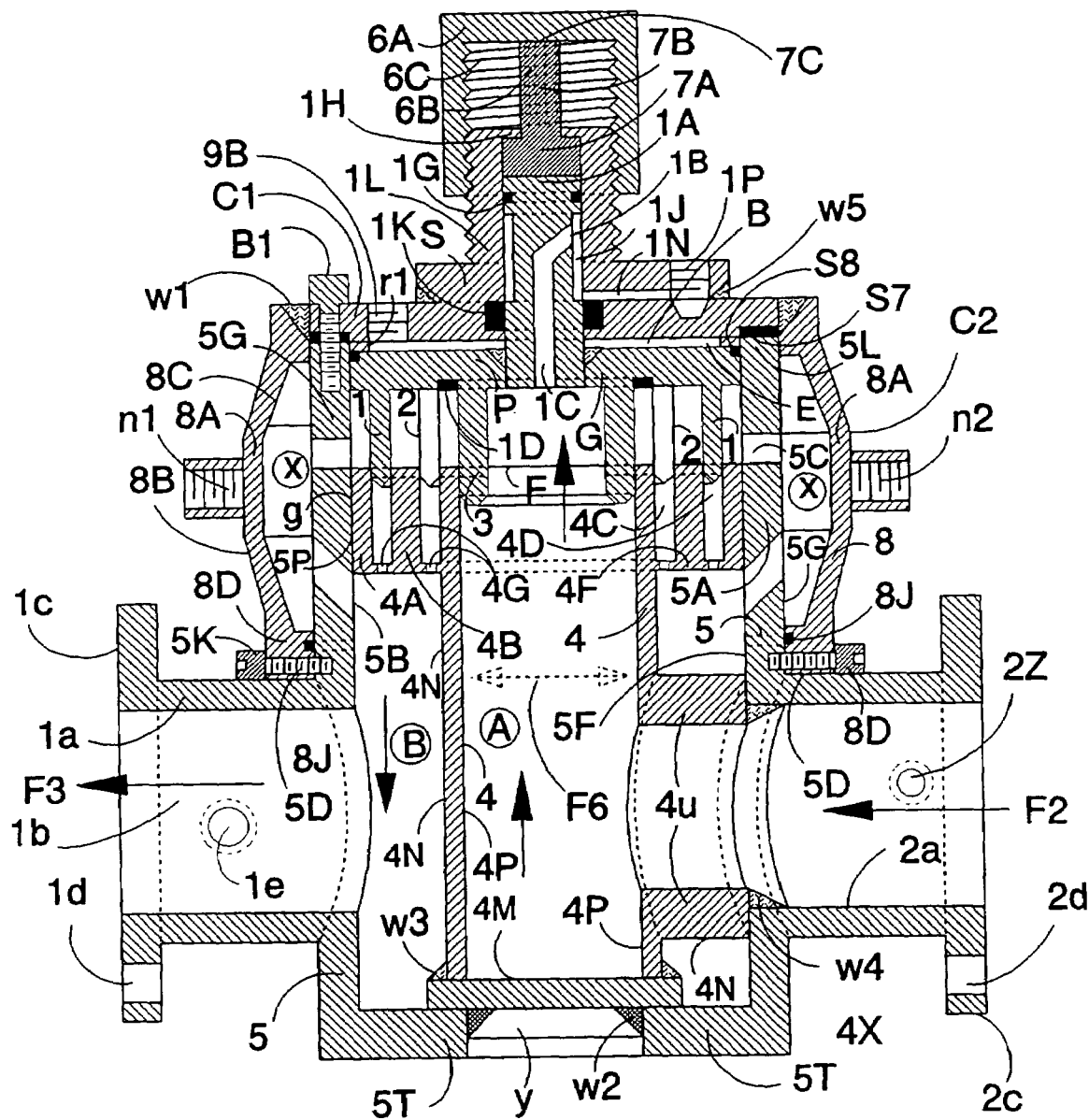
FIG. 2 is an axial vertical section through the center of the piston gate valve, where said piston has concentric tubes with linear openings.

The drawings are not drawn to any particular scale. All the drawings can be studied together. Generally (though not always), each element of the invention has been assigned a number in one or more drawings, and letters have been added to said number to identify constituent parts of that element. As shown in FIG. 1, the cage of the valve is shaped in the form of a cross "T", and has lower and upper portions. The lower portion constitutes inlet pipe 2a with flange 2c, inlet chamber 2b, and threaded outlet opening 2Z, on the right side of the cage; and outlet pipe 1a with flange 1c, outlet chamber 1b, and threaded opening 1e, on the left side of the cage. the lower portion of the cage also includes vertical cylindrical portion 5R of vertical cross tube 5. The cylindrical portion 5R has base closure plate 5T with circular opening Y. The upper portion of the cage lies above the lower two pipe legs 1a and 2a, and constitutes the upper cylindrical cage body of vertical cylindrical tube 5. The upper portion of the cage is covered by means of a composite cover shown by C1 and C2. The top section of the cover, shown by C1, covers open end 5L of 5, and the cylindrical cover shown by C2 covers the cylindrical section of cylindrical tube 5 above pipes 1a and 2a. The cage is designed to accommodate different valve pistons to block or to regulate the flow of fluid through the valve body. The cover portion C2 is designed to handle the passage of fluid around partition means 5A through cylindrical cavity X. The cavity X (from here on will be known as second intermediate chamber) is also used to accommodate elastomeric diaphragm 9 shown in FIG. 6, to control fluid flow between tube 5 and cover C2. The lower portion 5F externally is provided with plurality of holes depicted by 5d to receive stems 5D of bolts 5K to fasten cover C2 to tube 5. The cylindrical cover C2 preferably takes the cylindrical form shown in FIGS. 1 to 3, or it may take the cylindrical form shown in FIGS. 6 and 7. The cylindrical section 8A of cover C2 on it ends is provided tapered end portions 8B and 8C. Preferably at least two nuts n1 and n2 are welded to cover C2 to receive bolt stems to make handles for the ease of mounting and dismounting cover C2 over and around tube 5. A plurality of openings 8F, corresponding to the sizes of bolts 5K, are provided in the end portion 8D of cover C2. On each end of partition means 5A a plurality of Inlet openings 5C and outlet openings 5B are provided in the body of cylindrical tube 5. The inner and outer diameters of tube 5 are shown by 5P and 5X. Seal S7 is used between 5L and cover C1 to block leakage of fluid. Cover C1 is provided with a plurality of threaded holes, corresponding to the sizes of bolts B1, to tie cover C1 to end 5L. At least one threaded opening 9B is provided in the cover C1. An externally threaded cylindrical housing for the rod of piston P shown in FIGS. 2, 3,6 and 7 is shown by 1L, and its pedestal is shown by S. The pedestal S may be welded to cover C1 as shown by welding W5 or may be held to cover C1 by means of bolts and seals (not shown). Shown in FIG. 2 and other FIGS., the housing 1L has cylindrical cavity 1Z (shown in FIG. 1) to receive mini-piston 7A and rod 1A of piston P. The end 7D (FIG. 1) and end 7C of rod 7B, of mini-piston 7A, can be forced to move downward by means of the screw action of internal threads 6C of cap 6A and external threads of 1L. Shown in FIG. 2 mini-piston 7A can be made to move in the opposite direction by rotating the cap 6A upward while the piston rod 1A of piston P is pushed upward by the pressurized fluid, in chamber A, received from the pipe system. The cover portion C1 and C2 may be cast integrally or machined integrally, or they can be welded together after manufacturing them separately as shown by welding W1. Pedestal S is provided with a fluid channel 1Z, and with a threaded hole 1P which provides means to access fluid from chamber A, through the piston rod 1A, from outside the valve, as shown in FIG. 2 and other FIGS. Flange partition g is made to have a close fit along side outer partition means 5A in tube 5.

FIG. 2 shows a pressure reducing valve which depicts the cage described under FIG. 1, and also depicts piston valve components mounted inside the upper portion of the cage. The piston valve components will now be explained: The valve includes inlet chamber A which receives inlet flow F2 from the inlet pipe (not shown) connected to pipe 2a of the cage. The inlet chamber A is comprised of the vertical cylindrical tube 4 which also has a shorter tube leg 4U which is welded to 2a, where the welding is shown by w4. The lower end of tube 4 is closed by welding plate 4M to tube 4 as depicted by weld w3. Tube 4M is also welded to base plate 5T, on the bottom side, as shown by welding w2. The opposite end of tube 4 has a circular flange g which provides seat F for flat plate G of piston valve P. The cavity in which the piston is installed will be from here on be known as the "first intermediate chamber". The flange partition means g has corresponding cylindrical cavities 4C and 4D for the concentric tubes 1 and 2 which project from piston P into cavities 4C and 4D. The depth of cavities 4C and 4D and height of tubes 1 and 2 are predetermined. Piston P also has an optional circular tube 3 projected into chamber A. The cavities 4C and 4D are concentric with tube 4. The cylindrical walls for cavities 4C and 4D are shown by 4; 4B and 4A. The bottom of flange g is indicated by 4F, and it is provided with predetermined number of openings, of predetermined sizes, shown by 4G. The hidden flow around tube 4, in outlet chamber B, is shown by F6.

Figure 3:
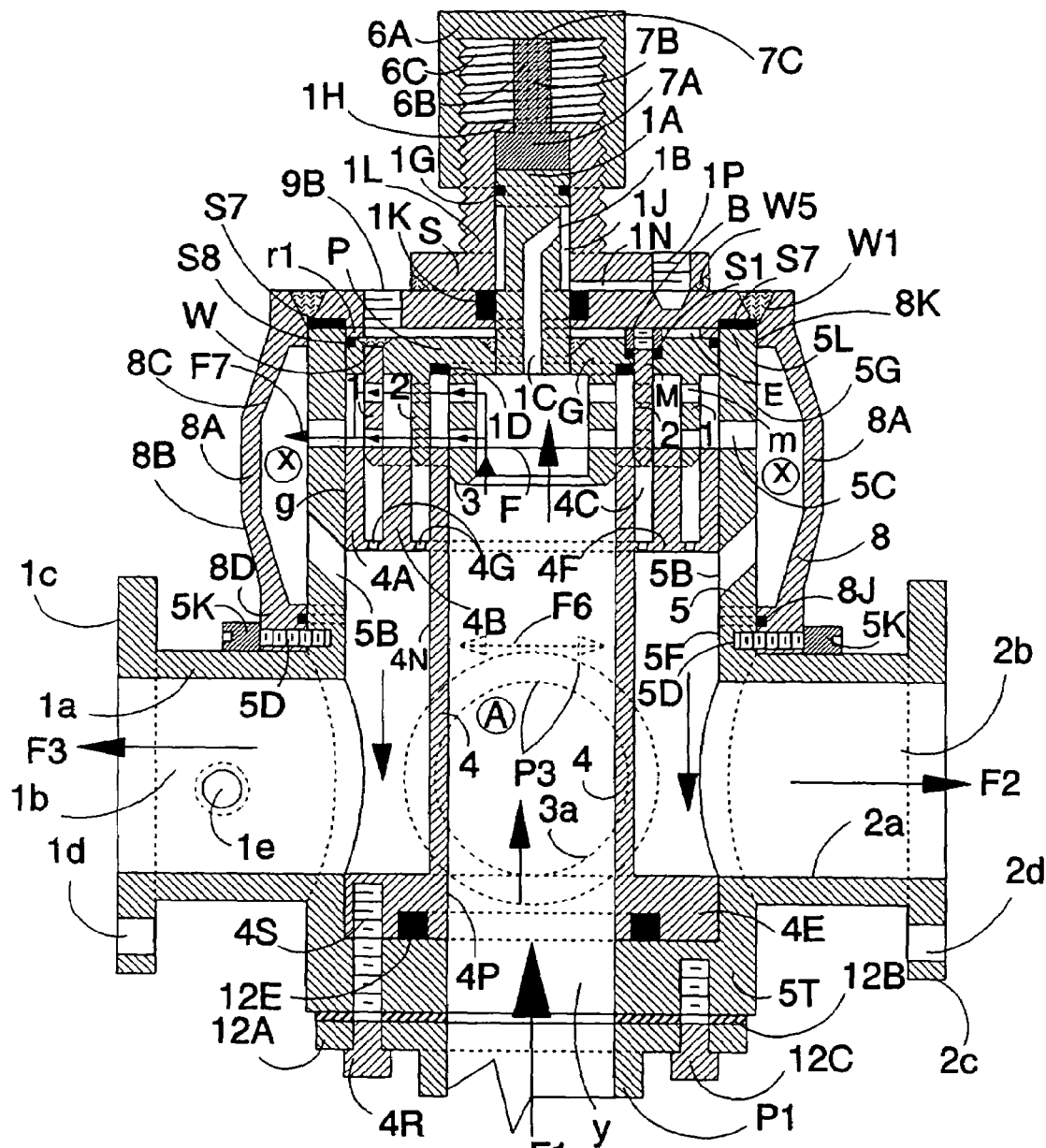
FIG. 3 is another axial vertical section similar to that of FIG. 2 where the piston has concentric tubes having perforated openings arranged linearly in the body of the tubes.

Piston P has rod 1A mounted inside of housing 1L. The rod 1A may be constructed as an integral part of plate G of piston P, or it may be welded to plate G as shown by welding W11 in FIG. 5. Each concentric tube projecting from piston plate G is provided with a plurality of linear openings N (shown in FIG. 4) running parallel to the axis of rod 1A. Alternatively, each tube can be provided with a plurality of circular openings m (shown in FIG. 3) for the passage of fluid. Each opening in the inner tube faces a solid opposite wall in the next outer cylindrical tube. Thus, when fluid passes through the opening in the inner tube it strikes against the opposite solid wall of the outer tube, and is therefore redirected in multiple directions, approximately normal (90 degrees) to the original flow. Two solid portions of walls are indicated by 1 and 3 in FIGS. 4 and 5. Thus, many fluid strikes, against walls, and also many collisions between opposite fluid streams, are created to dissipate energy, which thereby reduces fluid pressure at the exit of the valve. The piston P can be cast to be an integral part of concentric tubes 1, 2 and 3, or each tube can be held to plate G by various other means. In FIG. 3 tube 2 is shown held to plate G by means of a plurality of integrally threaded stems M and bolts B, where tube 1 is shown held to plate G by means of a plurality of stems (without threads) welded to plate G, where the welding is indicated by W.

The rod 1A of piston P is provided a tubular passage which has inlet 1C and outlet 1B for the passage fluid. The piston P along with tubes 1; 2 and 3 are lowered into the valve cage 5 and are mounted inside cavities 4C and 4D (FIG. 2) of flange g and chamber A in tube 4, respectively. It is pointed out here that the location of tube 3 of piston P inside chamber A is optional. It is also pointed out that the number of inner tubes, like 1 and 2, of piston P may vary in number, and they can be more than two in number, or there may be only one tube or no tube at all. The number of said tubes are dependent on the pressure and temperature ranges of the fluid which will be handled by the valve. Once the piston P is installed in the cage, the composite cover, made of C2 and C1, is mounted over end 5L of cage 5, by mounting rod 1A first into cavity 1Z (FIG. 1) of housing 1L. The cover C1 is held to end 5L of cage 5 by means of a plurality of bolts B1 (FIG. 1). In some cases bolts B1 may not be required, as shown in FIG. 3. To use or not to use the bolts B1 strictly depends on the fluid pressure being handled by the valve. Once the cover is secured to 5L then stems 5D of plurality of bolts 5K are driven into holes 5d (FIG. 1) to fasten end 8D of C2 to tube S.

as shown in FIGS. 1 to 3, housing 1L for piston rod 1A is welded to cover C1. The housing may be held to the cover by other means, such as with bolts driven into C1 or by bolts and nuts, while placing a seal between pedestal S and cover C1 to prevent any fluid leakage. The welding of pedestal S and C1 is indicated by w5. The externally threaded housing 1L holds a mini solid piston shown by its wider flat end 7A, rod 7B and its rod end 7C. Once the rod 1A is mounted into cavity 1Z (FIG. 1) and mini piston 7A is pushed against the internal flange 1H of housing 1L, then cap 6A, having internal threads 6C, is mounted over end 7C of stem 7B of mini piston 7A, and it is screwed around externally threaded 1L. It is pointed out here that mini piston and rod 1A can be integrated into one single element. It is also contemplated that, in some applications, if required, a spring will be loaded between mini piston 7A and rod 1A; though said spring is not shown in these drawings.

Circumferentially spaced, a plurality of passages 5B and 5C are formed in the upper portion of the cage 5 around the partition means 5A and the outer face of partitioning flange g extending through the body of the cage from inlet chamber A to the partition means 5A. Each passage has an inlet portion 5C, opening into the inlet chamber X adjacent one face of the composite partition means (5A and g), and also an outlet portion 5B, opening into the outlet chamber adjacent the other face of the composite partition means 5A and g on the other side of the cage. Said passages are covered by cylindrical cover means 8, which provides cylindrical cavity X between the cylindrical cover means 8 and the upper portion body of the cage 5 for the designed volume of fluid flow.

How the piston is operated will now be explained: The piston valve P is controlled by means of pressurized fluid taken from upstream from the piston. The pressurized fluid also can be taken from an independent pressurized fluid source outside the pipe line. The fluid flow from inlet chamber A can be accessed through threaded access opening 1P, by first letting the fluid pass through tubular fluid passage 1C in rod 1A, then letting it pass through passage 1B, then through tubular passages 1J and 1N, where 1J is situated between rod 1A and housing 1L. Therefore these passages, when taken together, comprise a duct that is accessible from outside the valve. Tapping hole 1P is connected first to a conventional needle valve (not shown), then the needle valve is connected to the threaded opening 9B in cover C1, and to a conventional pilot control valve, which is further connected to the threaded opening 1e at the outlet chamber B of the cage. The two-way flow opening 9B supplies pressurized fluid to chamber E which is created between cover C1 and piston P. The cavity E is created by placing a separating ring r1 between cover C1 and piston P. Ring r1 may be made an integral part of piston P or it may be made an integral part of cover C1. Thus the piston valve can be modulated with the aid of the pilot control valve to control the fluid flow under the piston, while the needle valve controls the speed of opening and closing of the valve. Piston P can also be operated manually or by means of an electric motor. When the cap 6A is rotated upward, the mini piston 7A reacts to the threads of 6A and it exerts downward pressure against rod 1A and moves rod 1A and piston P toward seat F. By rotating cap 6A in the opposite direction, the pressurized fluid in chamber A pushes the piston in the direction of cap 6A. Thus cap 6A, end 7C of mini piston 7A, and rod 1A always remain in contact with one another. The pressurized fluid can also be taken from the inlet pipe 2a by means of threaded tapping opening 2Z (FIGS. 1 and 2). When piston P is moved against seat F, the seal gasket 1D shuts off the flow of fluid toward tube 2. Thus, piston valve P can also function as a shut-off valve. The openings 4G, in the bottom of 4F of flange g, are provide to lower fluid pressure in cavities 4C and 4D (FIG. 2) in favor of piston P. Thus, unlike conventional piston valves, piston valve P need not to be spring loaded. In some cases, where quick shut off or opening of the valve is desired, the piston may be spring loaded accordingly. The sizes and number of openings 4G are predetermined. Seal gaskets, to prevent leakage of fluid, in FIGS. 1 to 11, are shown by 1G; 1K; 1D; S7; S8; 8J; S1; 12B and 12E. The design and location of the seals may vary from valve to valve.

FIG. 3 is very similar to FIG. 2, except FIG. 3 shows a five way fluid control valve. Four flow pathways are shown by F1, F2, F3, and by a flow through pipe P3 which is shown with inner diameter 3a. The fifth flow path in the pipe, though not shown, would be directly on the opposite side of pipe P3. It is pointed out here that there will be at least one inlet flow and one outlet flow for the valve shown in FIG. 3. As is the case in any other FIG., in FIG. 3 the vertical axis of tube 4 defines the center of the valve. The inlet flow F1, in FIG. 3, coming from the pipe line P1, enters inlet chamber A inside tube 4. The base of the valve 5T is connected to P1 by means of flange 12A and a plurality of bolts 12C. To fix tube 4 in place, flange 4E of tube 4 is secured to the base of the valve 5T by means of at least one bolt 4R. Instead of radial linear openings for passing fluid from chamber A to cavity X between cage wall 5 and cover C2, circular radial openings are provided. The flow lines depict the flow of fluid through the circular openings provided in the concentric tubes, and exiting through wall 5, are shown by F7. The rest of the valve was explained in FIGS. 1 and 2.

Figure 5:
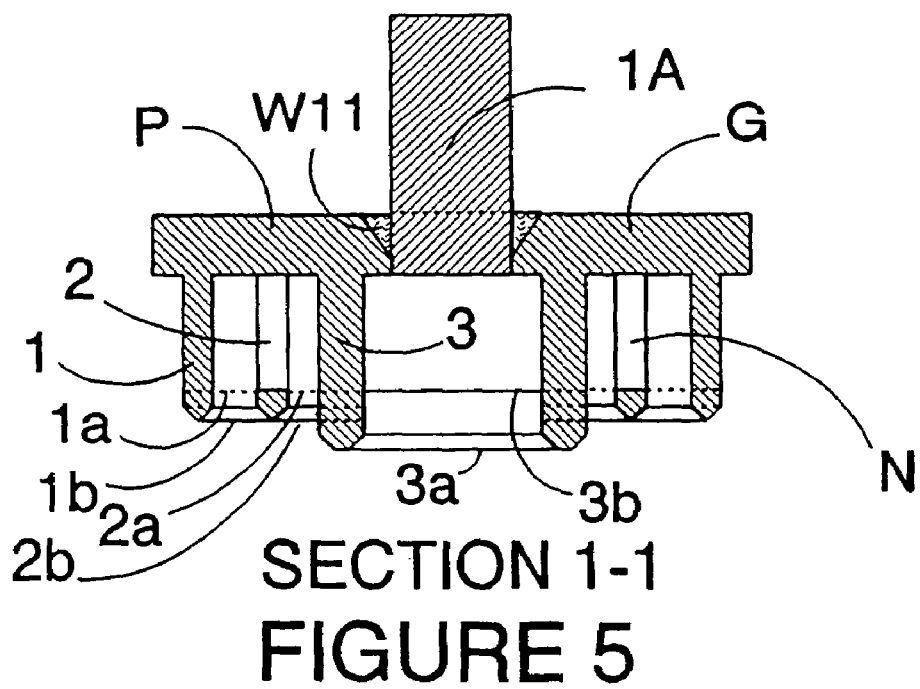
FIG. 5 is the transverse vertical section taken on line 1—1 of FIG. 4.
Figure 4:
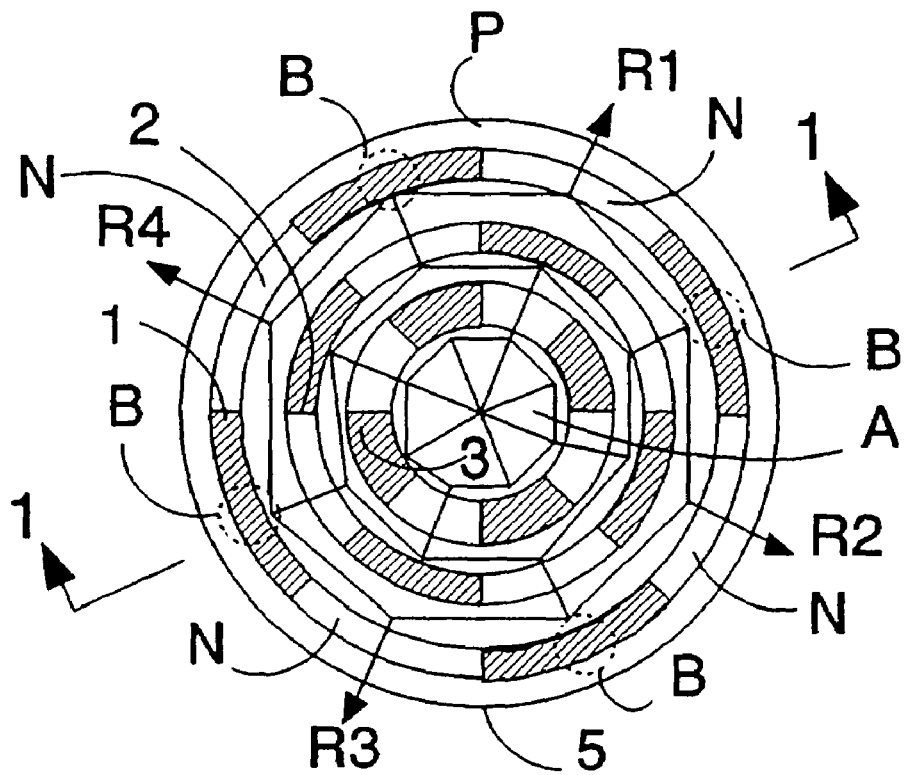
FIG. 4 shows the staggered arrangement of radial openings, and fluid flow pathways, including fluid flow strikes, and subsequent diversion of flow directions.

FIG. 4 shows the paths of fluid streams passing through the linear openings N provided in the walls of concentric tubes 1, 2 and 3. FIG. 4 depicts the principle of fluid strikes when fluid passes from chamber A to the inner face of the wall of cage 5. The said paths of fluid streams are shown to (approximately) represent paths of fluid streams. Said simplified paths look like polygons in FIG. 4, each of the corners of which depict either a fluid stream striking a barrier, or two fluid streams colliding with each other before passing through an opening in one of the three concentric tubes depicted. Though three concentric tubes are shown in FIG. 4, the invented valve may use more or fewer concentric tubes, and may even use only one tube, depending on the desired functionality. The more openings there are through the concentric cylindrical walls, the fluid more strikes there will be. In the invented valve the total area of all passage openings in any particular concentric tube, will preferably be the same as the total area of all passage openings in any of the other concentric tubes. That is, the total open area through all tubes will preferably be the same. FIG. 4 is only a useful simplification to present how, in the invented valve, alternating barriers, and the collisions that fluid makes with them, are used to dissipate energy in a fluid stream. It is also pointed out here that FIGS. 4 and 5 show only the principle of fluid strikes, and do not depict the actual sizes of the openings for the passage of the fluid. Whenever a fluid stream collides against a solid wall, or whenever two streams of fluid strike against each other, a tremendous amount of energy in the fluid is dissipated; thus, very high fluid pressures in the valve can be reduced more quickly than is the case with conventional piston valves.

FIG. 5 shows a vertical section taken on line 1—1 of FIG. 4. The piston P has flat plate G and rod 1A, where, shown projecting downward parallel to 1A, are concentric tubes 1, 2 and 3 provided with openings for the passing of fluid. For clarity in FIG. 5, not all possible lines at a distance, nor all possible dotted lines, are shown, which lines would otherwise represent more edge portions of openings through concentric walls. The bottom ring sections of tubes 1, 2 and 3 are shown by 1a, 1b; and 2a, 2b; and 3a and 3b. Opening section for the passage of fluid is shown by N.

FIG. 6 is the same as FIG. 2, but is modified for the attachment of tube 4 and 4U to cage 5. FIG. 6 also depicts a modified asymmetric elastomeric diaphragm 9 similar to a diaphragm invented by the inventor in U.S. Pat. No. 6,672, 334 B2. The cover C2 is made more cylindrical in its outer surface. Instead of welding closure plate 4M to the base of valve 5T, plate 4M is kept free by providing a seal gasket 12E to prevent any leakage of fluid. Similarly, 4U is provided with a seal gasket V to prevent leakage. A sleeve 4V is inserted into pipe 2a to keep both gasket V and tube inlet extension 4U in place. One end of sleeve 4V is kept in place by the wall section 5Y of 4, and the other end by the flange of the pipe not shown. The sleeve can also be kept in place by means of an external bolt (not shown) which can be driven into sleeve 4V, through pipe 2a, where said bolt will be provided with a gasket under its head to seal off any leakage of fluid from the valve. The function of the piston with concentric tubes 1,2 and 3 has already been discussed under previous FIGS. The bell type elastomeric diaphragm 9 is installed in cavity X between cylindrical cage 5 and cylindrical cover C2. The cavity is divided into three cavities in FIG. 6; X1 under the hump of the diaphragm 9E and cavities X2 and X3 around the two legs and two sides of the hump. The longer leg 9C of the diaphragm is seated around 5F and partition means 5A, and short leg 9A is seated around 5G. Two ends of diaphragm 9 are shown by 9b and 9D. Cover C2 is provided with threaded openings 8S and 8T. To control fluid flow under the elastomeric diaphragm 9, the diaphragm may be operated by the same set of pilot control valve and needle valve used to operate the piston valve, or a separated set of said valves may be provided. Thus, pressurized fluid may be accessed from inlet openings different than opening 2Z. In some cases it might be more practical to provide an opening in hump 9E toward leg 9b similar to opening 10 of FIG. 2 of the previous cited U.S. Pat. No. 66,672,334 B2. The function of the cavities X2 and X3 is the same as of cavity E between cover C1 and piston plate G (FIG. 2). Cavities X2 and X3 are charged with pressurized fluid to control the diaphragm by means of conventional pilot control and needle valves, thus allowing for the control of fluid through the valve. The operation of the diaphragm is also discussed in the above cited patent. The invented diaphragm differs from the diaphragm in the cited patent, in that the hump of the invented diaphragm is situated entirely over 5C (FIG. 2) and the two legs of the diaphragm are unequal. This allows for a reduction in the overall diaphragm length and in the length of cover C2. It is understood that any corners may be rounded off or any taper may be provided between 5 and cover C2 to facilitate the mounting of diaphragm 9 around 5.

FIG. 7 is similar to FIG. 6, but is shown without an elastomeric diaphragm, and piston P is modified. The piston in FIG. 7 is made of only flat plate P2 and rod 1A. The piston P2 is not provided with concentric tubes 1,2 and 3 as shown in FIGS. 1,2, and 3. Flange g is also modified. Flange g is provided with a plurality of opening means 4Z connected to outlet chamber B. The plurality of cylindrical openings 5C, through cylindrical wall 5, along with the cylindrical openings 4Z, through partition means g, act together to increase the valve's fluid capacity. Under pressurized fluid in cavity E when the piston P2 is seated over seat F the seal gasket 1D seals off the fluid flow and shuts off the passage of fluid from chamber A to chamber B. The rod 1A may be an integral part of piston P2, or it may be welded to the piston as shown by weld w12. The rest of FIG. 7, and the operation of the piston, was explained under other FIGS.

FIG. 8 is similar to FIG. 7 except that the valve has an elastomeric diaphragm means, in the shape of a big hat, to control the flow of fluid; cover C2 is eliminated and only cover C1 is used; and the height of wall 5 is shortened. The inventor invented the hat type elastomeric diaphragm in U.S. Pat. No. 6,834,675 B1. The elastomeric diaphragm is seated over circular seat F provided by flange g. The circular seat is provided with linear openings 4Z for the passage of fluid. The diaphragm has central circular hump 9a and circular flat portion 9b with outer diameter 9C. The hump 9a is situated right over inlet chamber A. Diaphragm D and the cover C1 create cavity E2 between them, which is charged with inlet fluid accessed from chamber A through outlet tube 9d which is connected to the center of hump 9a of diaphragm D. The tube 9d has base 9e and opening 9g and has threaded end portion 9f. The cover C1 is provided with opening 9B, for two-way fluid flow, which is connected by means of a tube to a pilot control valve (not shown), and the pilot valve is connected to the needle valve (not shown), and the needle valve is connected to tube 9d and the pilot valve also is connected to threaded opening 1e at the outlet chamber B. Thus, the diaphragm D can be controlled by means of conventional pilot and needle valves to operate the diaphragm valve in FIG. 8. The circular border portion of diaphragm D is tied between end C4 (of cylindrical wall C3 of cover C1) and 5F by means of a plurality of bolts bi. When the pressure is reduced in cavity E2, then portion 9b around hump 9a is lifted up, and fluid passes through openings 4Z. When the cavity E2 is fully pressurized with the fluid, then portion 9b closes the openings 4Z, and blocks the passage of fluid through seat F. The rest of the elements of the valve were explained elsewhere.

FIG. 9 is the same FIG. as FIG. 8 but the bottom portion of the valve is constructed as a mirror image of the top portion. The valve therefore has two elastomeric diaphragms, and diaphragm 9J and tube 9K depict the mirror image of diaphragm D and tube 9d. Two diaphragms can handle a higher volume of fluid flow than can one diaphragm. Both diaphragms D and 9J can be operated by the same set of pilot and needle valves. Hidden flow around 4 is shown by F6.

FIG. 10 is the same FIG. as FIG. 6 where piston P is modified into piston P2. Piston P2 has rod 1A which is mounted in housing 6 and a tubular channel 6a connected to inlet chamber A and outlet 1B is fluidly connected to threaded opening 6b. The rod of the piston is loaded with optional spring 6C. The functions of the seal gaskets 1D, 1K, and 1G are the same as was explained with other FIGS., i.e., they are used to prevent fluid leakage. The valve shuts off the flow of fluid when seal 1D of piston P2 presses against seat F provided by flange g. The function of openings 4G is to reduce pressure under piston P2, to thereby reduce fluid resistance so that the piston can move toward seat F. Thus the piston can be operated without spring 6C, but the spring does improve the speed of the piston's movement to the shut off position, against seat F. The valve functions in the same way as in FIG. 6. In some applications more springs like spring 6 may be provided by installing each spring in an individual housing constructed integrally with C1, with each spring directly acting against P2.

FIG. 11 is the same FIG. as FIG. 11, but the cover C1 is integrated with cover C2 by welding W1, and the piston is removed from the valve. The rest of the valve is the same as in FIG. 10. The valve is operated strictly by means of the elastomeric diaphragm flow control means explained in FIG. 6. A seal gasket g1 is provided, to stop the leakage of fluid between 5 and g. Openings 4G, shown in other FIGS. are not provided in the bottom portion 4F of flange g.

It is understood that cover 2 can also be connected to tube 5 by means of conventional pipe flanges, bolts, and nuts, by providing a flange to tube 5 and a matching flange to portion 8D of cover C2. It is equally possible to adapt other types of connectors to connect C2 to tube 5. Whereas this invention is here illustrated and described with references to the embodiments thereof presently contemplated as the best mode of carrying out such invention in actual practice, it is to be understood that various changes may be made in adapting the invention to different embodiments without departing from the broader inventive concepts disclosed herein and comprehended by the claims that follow:

I claim:

1. A flow control and pressure reducing valve comprising:
   a cage constituting a body;
   a lower body of the cage constituting at least two pipe legs, and having at least one inlet opening and at least one outlet opening for the fluid;
   means to prevent communication between the inlet and outlet openings through the lower body;
   an upper cylindrical cage body which has a cylindrical access opening, which opening is used to mount and to dismount inner components of the valve, where by mounting the inner partition component inside the valve body, an inlet chamber and an outlet chamber, along with a first intermediate chamber, are created therein, with said inlet chamber being in flow communication with the inlet opening of the lower valve body, and said outlet chamber being in flow communication with the outlet opening of the lower valve body;
   a partition means within the upper valve body, which isolates the inlet chamber from the outlet chamber;
   a cylindrical cavity (X) which is a second intermediate chamber around said upper cage body extending through the upper valve body, has communicative passage means, around the partition means, to allow communicative fluid flow between said first intermediate chamber and said outlet chamber;
   a modifiable piston flow control gate means mounted in the first intermediate chamber, and means for positioning the piston in the intermediate chamber to restrict, to an intended degree, the flow of fluid to the second intermediate chamber and to the outlet chamber of the valve;
   cover means to cover said access opening, and to create said cylindrical cavity X which is the second intermediate chamber.

2. A flow control and pressure reducing valve according to claim 1, wherein the inlet chamber opens into the first intermediate chamber through the partition means.

3. A flow control and pressure reducing valve according to claim 1, wherein an upper cylindrical cage body is a cylindrical wall having concentric radial inlet passage means (5B) communicative with the first and second intermediate chambers, and outlet radial passage means (5C) communicative with the outlet chamber, where passage means (5B) and passage means (5C) are separated by partition means (5A).

4. A flow control and pressure reducing valve according to claim 1, wherein a modifiable piston flow control gate means mounted in the first intermediate chamber divides the intermediate chamber into two variable upper and lower cavities therein, where the upper cavity is fluidly communicative with the inlet chamber and the outlet chamber by means of a needle valve and a pilot valve, and the lower cavity is fluidly communicative with the inlet chamber and the second intermediate chamber.

5. A flow control and pressure reducing valve according to claim 1, wherein a modifiable piston flow control gate means, mounted in the first intermediate chamber, is provided with a guide rod driven by mechanical means, which rod drives the piston plate up and down in the first intermediate chamber to control fluid flow from the inlet chamber to the second intermediate chamber.

6. A flow control and pressure reducing valve according to claim 1, wherein a modifiable piston flow control gate means mounted in the first intermediate chamber divides the intermediate chamber into two variable upper and lower cavities therein, where the upper cavity has a threaded opening connected to the needle valve which is further connected to the pilot valve, and where the needle valve is fluidly communicative with the inlet chamber and the pilot valve is fluidly communicative with the outlet chamber; thus said upper cavity is always two-way fluidly communicative with the inlet chamber and the outlet chamber by means of needle and pilot valves.

7. A flow control and pressure reducing valve comprising:
   a cage constituting a body;
   a lower body of the cage constituting at least two pipe legs having at least one inlet opening and at least one outlet opening for the fluid;
   means of preventing fluid communication between the inlet and outlet openings through the lower body;
   an upper cylindrical cage body which has a cylindrical access opening to mount and to dismount inner components of the valve, where by mounting an inner partition component inside the valve body, an inlet chamber and an outlet chamber and a first intermediate chamber are created therein, with said inlet chamber being in flow communication with the inlet opening of the lower valve body, and outlet chamber being in flow communication with the outlet opening of the lower valve body;
   a partition means within the upper valve body, which isolates the inlet chamber from the outlet chamber;
   a cylindrical cavity (X) which is the second intermediate chamber around said upper cage body extending through the upper valve body, has communicative passage means to be communicative with the first intermediate chamber and the outlet chamber around the partition means, where a cylindrical bell type fluidly pressurized diaphragm flow control means, which is fitted in said cavity (X) controls the fluid flow through the cavity (X),
   cover means to cover said access opening and to create said cylindrical cavity X, which cylindrical cavity is the second intermediate chamber.

8. A flow control and pressure reducing valve according to claim 7, wherein the inlet chamber opens into the first intermediate chamber through the partition means.

9. A flow control and pressure reducing valve according to claim 7, wherein an upper cylindrical cage body is a cylindrical wall having concentric radial inlet passage means (5C) which are communicative with outlet radial passage means (5B) which are further communicative with the outlet chamber, where passage means (5B) and passage means (5C) are separated by partition means (5A).

10. A flow control and pressure reducing valve according to claim 7, wherein a cylindrical bell type fluidly pressurized diaphragm flow control means, fitted in said cavity (X) controls the fluid flow through the cavity, and divides cavity (X) into two variable upper and lower cavities therein, where upper cavity (X2) is fluidly communicative with the inlet and outlet chambers by means of a needle valve and a pilot valve, and the lower cavity (X1) is fluidly communicative with the inlet chamber and the outlet chamber.

11. A flow control and pressure reducing valve according to claim 10, wherein a cylindrical bell type fluildy pressurized diaphragm flow control means, fitted in said cavity (X) controls the fluid flow through the cavity (X), and the cavity (X) is provided with a threaded inlet opening to connect to the needle valve, thus said upper cavity is always two-way fluidly communicative with the inlet chamber and the outlet chamber by means of needle and pilot valves.

12. A flow control and pressure reducing valve comprising:
   a cage constituting a body;
   a lower body of the cage constituting at least two pipe legs having at least one inlet opening and at least one outlet opening for the fluid;
   means preventing communication between the inlet and outlet openings through the lower body;
   an upper cylindrical cage body which has a cylindrical access opening to mount and to dismount inner components of the valve, where by mounting the inner partition component inside the valve body an inlet chamber and an outlet chamber and a first intermediate chamber are created therein, with said inlet chamber being in flow communication with the inlet opening of the lower valve body, and with said outlet chamber being in flow communication with the outlet opening of the lower valve body;
   a partition means within the upper valve body, which isolates the inlet chamber from the outlet chamber;
   cover means to cover said access opening, and to create a cylindrical cavity (X), which cylindrical cavity is the second intermediate chamber.

13. A flow control and pressure reducing valve according to claim 12, wherein the inlet chamber opens into the first intermediate chamber through the partition means.

14. A flow control and pressure reducing valve according to claim 12, wherein the first intermediate chamber is fitted with the elastomeric flow control means, which is a diaphragm with the shape of a big flat hat, to control fluid flow from the inlet chamber to the outlet chamber, and which flow control means divides the intermediate chamber into two cavities (E1) under the diaphragm and cavity (E2) around top of the hump of the diaphragm.

15. A flow control and pressure reducing valve according to claim 14, wherein an elastomeric flow control means, in the shape of a big flat hat, to control fluid flow from the inlet chamber to the outlet chamber, has cavity (E1) which is always charged with fluid from the inlet chamber (A) and cavity (E2) which is always fluidly communicative with inlet chamber and the outlet chamber by means of needle and pilot valves.

16. A flow control and pressure reducing valve according to claim 15, wherein cavity (E1) is provided with at least one threaded opening for the purpose of providing a connection to a needle valve.

17. A flow control and pressure reducing valve according to claim 1, wherein a modifiable piston flow control gate means, mounted in the first intermediate chamber, has concentric tubes with respect to the piston rod, and said tubes are provided staggered passage openings to cause fluid strikes, and said tubes are projected into the corresponding circular cavities provided in the body of a redial flange partition means, where said flange projects radially from the cylindrical wall of chamber A.

18. A flow control and pressure reducing valve according to claim 1, wherein a modifiable piston flow control gate means, mounted in the first intermediate chamber, divides the intermediate chamber into two variable upper and lower cavities therein, where the upper cavity is fluidly connected by means of a tube to the outlet chamber to make the valve act as reverse flow check valve.

19. A flow control and pressure reducing valve according to claim 10, wherein a cylindrical bell type diaphragm flow control means, fitted in the cavity (X2), is fluidly connected by means of a tube to the outlet chamber to make the valve act as reverse flow check valve.

20. A flow control and pressure reducing valve according to claim 10, wherein first intermediate chamber is fitted with the elastomeric flow control means with the shape of a big flat hat to control fluid flow from the inlet chamber to the outlet chamber, where its cavity (E2) around top of the hump of the diaphragm is fluidly connected by means of a tube to the outlet chamber to make the valve act as reverse flow check valve.

* * * * *